United States Patent
Krishnamurthy et al.

(10) Patent No.: US 8,520,617 B2
(45) Date of Patent: Aug. 27, 2013

(54) INTERFERENCE MITIGATION IN HETEROGENEOUS WIRELESS COMMUNICATION NETWORKS

(75) Inventors: Sandeep H. Krishnamurthy, Arlington Heights, IL (US); Michael E. Buckley, Grayslake, IL (US); Murali Narasimha, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 256 days.

(21) Appl. No.: 12/938,022

(22) Filed: Nov. 2, 2010

(65) Prior Publication Data
US 2011/0110251 A1    May 12, 2011

Related U.S. Application Data

(60) Provisional application No. 61/258,968, filed on Nov. 6, 2009.

(51) Int. Cl.
*H04W 4/00*    (2009.01)

(52) U.S. Cl.
USPC ........... 370/329; 370/338; 370/341; 370/343; 370/345

(58) Field of Classification Search
USPC ................ 370/252, 328, 337, 329, 338, 341, 370/343, 345; 375/226, 346; 455/553.1
See application file for complete search history.

(56) References Cited

U.S. PATENT DOCUMENTS

| | | | |
|---|---|---|---|
| 6,594,240 B1 | 7/2003 | Chuah et al. | |
| 7,016,333 B1 * | 3/2006 | Kokudo | 370/337 |
| 7,940,740 B2 | 5/2011 | Krishnamurthy et al. | |
| 2005/0271387 A1 | 12/2005 | Kee et al. | |
| 2006/0293060 A1 | 12/2006 | Yang et al. | |
| 2007/0173260 A1 | 7/2007 | Love et al. | |
| 2007/0173276 A1 | 7/2007 | Love et al. | |
| 2008/0025254 A1 | 1/2008 | Love et al. | |
| 2008/0220807 A1 | 9/2008 | Patel et al. | |
| 2008/0280638 A1 | 11/2008 | Malladi et al. | |
| 2009/0042601 A1 * | 2/2009 | Wang et al. | 455/553.1 |

(Continued)

FOREIGN PATENT DOCUMENTS

| | | |
|---|---|---|
| EP | 1909523 A1 | 4/2008 |
| GB | 2404113 A | 1/2005 |

(Continued)

OTHER PUBLICATIONS

Korean Intellectual Property Office, Non-Final Office Action for Korean Patent Application No. 10-2011-7002317 dated Jun. 26, 2012, 4 pages.

(Continued)

*Primary Examiner* — Hassan Kizou
*Assistant Examiner* — Toan Nguyen

(57) ABSTRACT

A method in a wireless terminal transceiver includes receiving a sequence of frames from a first base station, wherein each frame in the sequence contains a first set of time-frequency resources which may be used for scheduling data and a second set of time-frequency resources not used for scheduling data. The transceiver also receives a message from the first base station identifying a third set of time-frequency resources that is a subset of the first set of time-frequency resources, and estimates the channel state based on the transmission received in the third set of time-frequency resources.

4 Claims, 3 Drawing Sheets

(56) References Cited

U.S. PATENT DOCUMENTS

| | | | |
|---|---|---|---|
| 2009/0207793 A1 | 8/2009 | Shen et al. | |
| 2009/0227263 A1 | 9/2009 | Agrawal et al. | |
| 2009/0257390 A1 | 10/2009 | Ji et al. | |
| 2009/0262854 A1 | 10/2009 | Lee et al. | |
| 2009/0316842 A1* | 12/2009 | Lu et al. | 375/346 |
| 2010/0027484 A1 | 2/2010 | Imamura et al. | |
| 2010/0029289 A1 | 2/2010 | Love et al. | |
| 2010/0046595 A1* | 2/2010 | Sikri et al. | 375/226 |
| 2010/0284326 A1* | 11/2010 | Oh | 370/328 |
| 2011/0110240 A1 | 5/2011 | Bergquist et al. | |

FOREIGN PATENT DOCUMENTS

| | | |
|---|---|---|
| JP | 2000-209661 A | 7/2000 |
| WO | 2008039034 A2 | 4/2008 |
| WO | 2008041582 A1 | 4/2008 |
| WO | 2009026162 A1 | 2/2009 |
| WO | 2009035983 A1 | 3/2009 |

OTHER PUBLICATIONS

Patent Cooperation Treaty, "Search Report and Written Opinion" for International Application No. PCT/US2010/055546 Jul. 4, 2011, 22 pages.
TSG-RAN Working Group 4 (Radio) Meeting #52, R4-093244 "Downlink Interference Between eNodeB and Home eNodeB" NTT DOCOMO, Shenzhen, Aug. 24-28, 2009, 8 pages.
United States Patent and Trademark Office "Non-Final Rejection" for U.S. Appl. No. 12/184,235 dated Mar. 14, 2012, 14 pages.
United States Patent and Trademark Office "Non-Final Rejection" U.S. Appl. No. 12/829,534 dated Mar. 28, 2012, 9 pages.
United States Patent and Trademark Office "Non-Final Rejection" for U.S. Appl. No. 12/184,235 dated Sep. 23, 2011, 11 pages.
3GPP TSG RAN WG1 #51, R1-074661 "Clarification of CQI/PMI/rank reporting mechanisms on PUCCH/PUSCH", Sharp, Jeju, Korea, Nov. 5-9, 2007, 3 pages.
Qualcomm Europe: "Range expansion for efficient support of heterogeneous networks", 3GPP TSG-RAN WG1 #54, R1-083195, Aug. 18-22, 2008, Jeju, S. Korea, all pages.
Patent Cooperation Treaty, "PCT Invitation to Pay Additional Fees and, where Applicable, Protest Fees" for International Application No. PCT/US2010/055546 Mar. 15, 2011, 7 pages.
3GPP TSG-RAN WG Meeting #51bis, R4-092399 "Impact of HeNB interference on paging channel performance" Motorola, Los Angeles, USA Jun. 29-Jul. 2, 2009; 6 pages.
3GPP TSG-RAN WG4 #51, R4-091908 "Partial Bandwidth Control Channel Performance" Qualcomm Europe, San Francisco, USA, May 4-8, 2009, 4 pages.
3GPP TR 36.9xx 0.2.0 (Mar. 2009) Technical Report, 3rd Generation Partnership Project; Technical Specification Group Radio Access Networks; LTE FDD Home eNodeB RF Requirements Work Item Technical Report (Release 9), 24 pages.
3GPP TR 25.967 9.0.0 (May 2009) Technical Report, 3rd Generation Partnership Project; Technical Specification Group Radio Access Networks; Home Node B Radio Frequency (RF) Requirements (FDD) (Release 9) 56 pages.
United States Patent and Trademark Office "Final Rejection" U.S. Appl. No. 12/829,534 dated Dec. 7, 2012, 10 pages.
Krishnamurthy et al., "Signaling Femto-Cell Deployment Attributes to Assist Interference Mitigation in Heterogeneous Networks" U.S. Appl. No. 12/829,534 filed Jul. 2, 2010.
Patent Cooperation Treaty, "PCT Search Report and Written Opinion of the International Searching Authority" for International Application No. PCT/US2010/036315 Nov. 2, 2010, 15 pages.
R4-080710; 3GPP TSG RAN WG4 (Radio) Meeting #46bis; Shenzhen, People Republic of China; Mar. 31 to Apr. 4, 2008; 12 Pages.
R4-081112; 3GPP TSG RAN WG4 (Radio) Meeting #46bis; Kansas City, USA; May 5 to May 9, 2008; 10 pages.
Patent Cooperation Treaty, "PCT Search Report and Written Opinion of the International Searching Authority" for International Application No. PCT/US2009/049673 Dec. 14, 2009, 15 pages.
Xiang Chen et al.: "Coexistence Analysis Involving 3GPP Long Term Evolution", Vehicular Technology Conference, 2007, VTC-2007 Fall, 2007 IEEE 66th, IEEE, PI, Sep. 1, 2007, pp. 225-229.
LG Electronics Inc.: "Efficient Utilization of Unused PUCCH RB", 3GPP Draft; R1-082438 Efficient Utilization of Unused PUCCH RB, 3rd Generation Partnership Project (3GPP), Mobile Competence Centre; 650, Route Des Lucioles; F-06921 Sophia-Antipolis C, Jun. 24, 2008.

* cited by examiner

INTERFERENCE MITIGATION IN HETEROGENEOUS WIRELESS COMMUNICATION NETWORKS

CROSS REFERENCE TO RELATED APPLICATION

The present application is a non-provisional application of U.S. provisional Application No. 61/258,968 filed on 6 Nov. 2009, the contents of which are incorporated by reference herein and from which benefits are claimed under 35 U.S.C. 119.

FIELD OF THE DISCLOSURE

The present disclosure relates to wireless communications and, more specifically, to spectral efficiency optimization via interference control and mitigation in heterogeneous networks comprising macro-cells and home-base stations or femto-cells.

BACKGROUND

Some wireless communication networks are completely proprietary, while others are subject to one or more standards to allow various vendors to manufacture equipment for a common system. One standards-based network is the Universal Mobile Telecommunications System (UMTS), which is standardized by the Third Generation Partnership Project (3GPP). 3GPP is a collaborative effort among groups of telecommunications associations to make a globally applicable third generation (3G) mobile phone system specification within the scope of the International Mobile Telecommunications-2000 project of the International Telecommunication Union (ITU). The UMTS standard is evolving and is typically referred to as UMTS Long Term Evolution (LTE) or Evolved UMTS Terrestrial Radio Access (E-UTRA).

According to Release 8 of the E-UTRA or LTE standard or specification, downlink communications from a base station (referred to as an "enhanced Node-B" or simply "eNB") to a wireless communication device (referred to as "user equipment" or "UE") utilize orthogonal frequency division multiplexing (OFDM). In OFDM, orthogonal subcarriers are modulated with a digital stream, which may include data, control information, or other information, so as to form a set of OFDM symbols. The subcarriers may be contiguous or non-contiguous and the downlink data modulation may be performed using quadrature phase shift-keying (QPSK), 16-ary quadrature amplitude modulation (16QAM), or 64QAM. The OFDM symbols are configured into a downlink sub frame for transmission from the base station. Each OFDM symbol has a temporal duration and is associated with a cyclic prefix (CP). A cyclic prefix is essentially a guard period between successive OFDM symbols in a sub frame. According to the E-UTRA specification, a normal cyclic prefix is about five (5) microseconds and an extended cyclic prefix is about 16.67 microseconds. The data from the serving base station is transmitted on physical downlink shared channel (PDSCH) and the control information is signaled on physical downlink control channel (PDCCH).

In contrast to the downlink, uplink communications from the UE to the eNB utilize single-carrier frequency division multiple access (SC-FDMA) according to the E-UTRA standard. In SC-FDMA, block transmission of QAM data symbols is performed by first discrete Fourier transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling grants (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions. The UE transmits data on the physical uplink shared channel (PUSCH). The physical control information is transmitted by the UE on the physical uplink control channel (PUCCH).

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference signal (RS) sent from the eNB for channel estimation, subsequent data demodulation, and link quality measurement for reporting. The link quality measurements for feedback may include such spatial parameters as rank indicator, or the number of data streams sent on the same resources; precoding matrix index (PMI); and coding parameters, such as a modulation and coding scheme (MCS) or a channel quality indicator (CQI). For example, if a UE determines that the link can support a rank greater than one, it may report multiple CQI values (e.g., two CQI values when rank=2). Further, the link quality measurements may be reported on a periodic or aperiodic basis, as instructed by an eNB, in one of the supported feedback modes. The reports may include wideband or subband frequency selective information of the parameters. The eNB may use the rank information, the CQI, and other parameters, such as uplink quality information, to serve the UE on the uplink and downlink channels.

A home-basestation or femto-cell or pico-eNB or relay node (RN) is referred to as hetero-eNB (HeNB) or a hetero-cell or hetero base station in the sequel. A HeNB can either belong to a closed subscriber group (CSG) or can be an open-access cell. HeNBs are used for coverage in a small area (such as a home or office) in contrast with eNBs (also referred to as macro eNBs or macro-cells) which are typically used for coverage over a large area. A CSG is set of one or more cells that allow access only to a certain group of subscribers. HeNB deployments where at least a part of the deployed bandwidth (BW) is shared with macro-cells are considered to be high-risk scenarios from an interference point-of-view. When UEs connected to a macro-cell roam close to a HeNB, the uplink of the HeNB can be severely interfered with particularly when the HeNB is far away (for example >400 m) from the macro-cell, thereby, degrading the quality of service of UEs connected to the HeNB. The problem is particularly severe if the UE is not allowed to access the HeNB that it roams close to (for example, due to the UE not being a member of the CSG of the HeNB). However, even if the UE roams close to a HeNB that it is allowed to access, the interference can be substantial. Currently, the existing Rel-8 UE measurement framework can be made use of to identify the situation when this interference might occur and the network can handover the UE to an inter-frequency carrier which is not shared between macro-cells and HeNBs to mitigate this problem. However, there might not be any such carriers available in certain networks to handover the UE to. Further, as the penetration of HeNBs increases, being able to efficiently operate HeNBs on the entire available spectrum might be desirable from a cost perspective. Several other scenarios are likely too including the case of a UE connected one HeNB experiencing interference from an adjacent HeNB or a macro cell. The following types of interference scenarios have been identified.

HeNB (aggressor)→MeNB (victim) downlink (DL)
HUE (aggressor)→MeNB (victim)uplink (UL)
MUE (aggressor)→HeNB (victim)UL
MeNB (aggressor)→HeNB (victim)DL
HeNB (aggressor)→HeNB (victim)on DL
HeNB (aggressor)→HeNB (victim)on UL.

In this disclosure, we discuss HeNB uplink (UL) interference and downlink (DL) interference problems in further detail and propose a method that can enable a more effective co-channel/shared channel deployment of HeNBs in LTE Rel-9 systems and beyond.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the embodiments of the present invention.

DETAILED DESCRIPTION

Methods of a wireless communication device and a wireless base station are disclosed. The wireless communication device is served by a serving base station and receives from a neighbor base station a downlink transmission including a broadcast signal.

Figure 1:
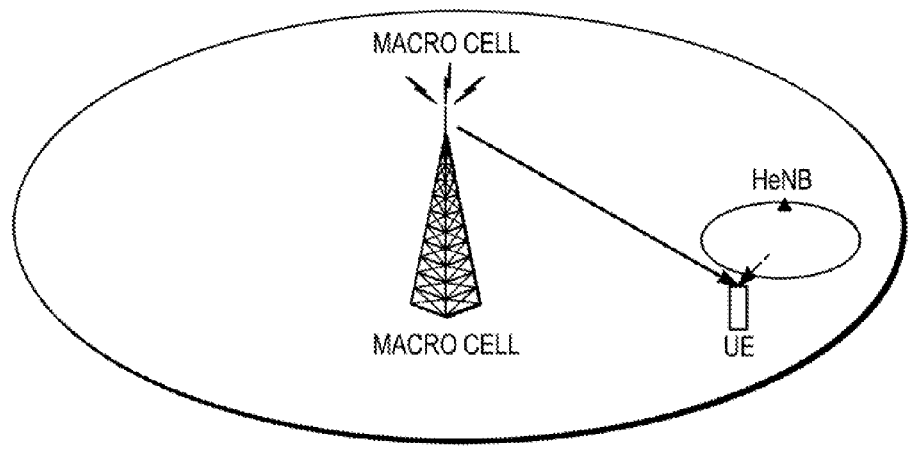
FIG. 1 is a schematic diagram of a macro-cell and a home-base station in the macro-cell's coverage area wherein the home-base station downlink transmission to its UE interferes with UE connected to the macro-cell.
Figure 2:
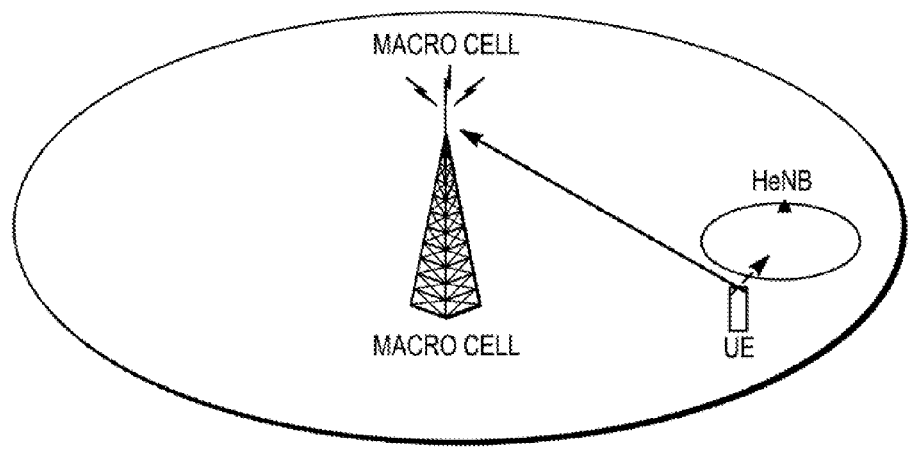
FIG. 2 is a schematic diagram of a macro-cell and a home-base station in the macro-cell's coverage area wherein a UE transmission to the macro-cell interferes with the home-base station uplink.

In a heterogeneous network comprising macro cells and HeNBs that have overlapping bandwidth (BW) deployments, certain interference problems can arise. One such interference problem is depicted in FIG. 1, where the downlink (DL) transmission from a macro-eNB (MeNB) to a UE that is close to (i.e., within signal range of) a HeNB interferes with DL transmissions to UEs connected to the HeNB. Another situation is shown in FIG. 2 where the uplink (UL) transmission from a UE connected to a macro-eNB that is close to a HeNB severely interferes with the UL of a UE connected to the HeNB. This case has been identified as interference scenario 3 in 3GPP TR 25.967 "Home Node B Radio Frequency (RF) Requirements (FDD) (Release 9)" in Universal Terrestrial Radio Access (UTRA) network.

The concept of coordinated multipoint transmission where multiple transmitters schedule UEs such that the transmissions are orthogonal in time-frequency, or there are statistical scheduling gains, are well known. The tight co-ordination required for coordinated multipoint transmission requires fast signaling between the multiple transmitters. HeNBs may not have X2 interfaces to other/macro eNBs (for reasons of cost, complexity and ease of installation) which makes tight co-ordination difficult. Certain ad-hoc techniques where the macro-cell blanks a number of subframes on DL while the load is transferred to HeNBs have been proposed in the 3GPP contribution R1-083195. However, this approach might not be feasible for widespread use as blanking is incompatible with LTE Rel-8 standard, and there might be large coverage holes as initial HeNB deployment will be sparse and the macro-cell will need to serve the UEs outside the range of HeNBs.

The method is inefficient since the blank sub-frames of the macro cell have to be adequate to support the needs of all HeNBs within the macro cell's coverage. Also, the necessary co-ordination between a Macro-cell and HeNB to enable dynamic allocation of blank subframes necessary to support retransmissions for HARQ processes in the CSG does not exist.

Synchronous deployment may be necessary for efficient implementation of this method.

Blanking subframes may interfere with CQI and PMI measurements for legacy Rel-8 UEs.

A HeNB may not use all time-frequency resources available to it for its transmissions. If a macro cell knows the subset of the time-frequency resources used by the HeNB (or an approximation of it), interference can be minimized by macro cell avoiding the use of those resources for transmission to/from UEs near the HeNB. The main principle is to make the subset of the resources used by a HeNB a function of its cell identifier. In this LTE context, a cell identifier can be a physical cell identifier (PCID) or global cell identifier (GCID). Thus when a UE sends a measurement report indicating the presence of a HeNB with identifier X, the macro cell is able to determine which time-frequency resources it should preferentially use to minimize interference when transmitting to the UE.

The time-frequency resources required by a HeNB vary with the cell loading (more resources are used when more UEs are connected to the cell). Therefore, to allow more accuracy in interference minimization, the following concepts are proposed:

A HeNB uses resources in a well defined order; that is, sets of resources R1, R2, R3 . . . , have a logical ordering such that R2 is used for scheduling only if R1 is already in use, R3 is used only if R2 is already in use, and so on.

A "load indicator" is included in the measurement report sent by the UE. The load indicator may be a measurement performed by the UE indicating the cell loading status, or information transmitted by the HeNB indicating its loading status. The load indicator along with the ordering defined above, enable the macro cell to get a better estimate of the resources that it should preferentially avoid.

Three embodiments of the present invention are described below.

In the first embodiment of the invention, a HeNB has a mapping function f( )→resources that it is allowed to use for all of its dynamic data scheduling. The mapping function maps at least one of an identity such as the PCID, a parameter related to the cell load, etc. to the resources. For example, if f(PCID, load)→resources can define the mapping function, where the load can just be equal to the number of UEs connected to the HeNB. Effectively, a scheduler pattern in time-frequency is defined as a function of PCID and the HeNB is allowed to use a subset of the resources in the scheduler pattern determined by scaling rules as a function of the load. The serving macro cell requests the UE to measure and report RSRP levels and the relative timing of neighboring cells (consisting of one or more HeNBs). The macro cell requests the UE to measure RSRQ on HeNBs using a pre-defined or a signaled pattern with time reuse over which measurements are carried out (e.g., pattern defined over 10 ms periodicity). This pattern would comprise a set of subframe number+OFDM symbol number+subcarrier combinations over which the UE is expected to carry out the RSSI measurements intended for its RSRQ or RS-SINR report. The idea is that, by configuring RSRQ or RS-SINR measurements over a certain subset of symbols in a radioframe for each HeNB, the serving cell can set up a system of equations to solve for the average loading in each of the HeNBs over the measurement duration. The serving macro cell uses the RSRQ or RS-SINR report from the UE to detect what the loading is in the HeNB (and therefore determine the subset of the scheduler pattern available for DL scheduling in the HeNB).

Once the serving cell is able to detect what the DL scheduler pattern is for the HeNB that the UE it is serving is close to, the serving cell can configure its DL scheduling resources orthogonal (or almost orthogonal) to this pattern to reduce DL interference from HeNBs.

The mapping function can be generalized to utilize one or more of PCID, GCID, TAC, CSG identity, etc.—f(PCID, GCID, TAC, CSG identity, load)→resources.

The mapping function can also utilize a frequency index (such as a subcarrier offset or resource block index) or a time index (such as a slot number, a subframe number or a frame number).

A separate mapping function that utilizes one or more of PCID, GCID, TAC, HeNB identity, CSG identity, etc. together with the DL/UL BW of the CSG cell and the duplexer separation can be used to determine an UL scheduler pattern that the CSG cell may use—g(PCID,GCID, TAC, CSG identity, load, DL BW, UL BW, duplexer separation, frequency_index, time_index)→resources.

The HeNB preferentially or mandatorily uses the resources indicated by the mapping for scheduling. The macro eNB excludes from its DL scheduling to the UE its DL resources that overlap with the resources of the HeNB's DL indicated by the mapping. If the HeNB transmission behavior is preferential (i.e., not mandated), there would be only be gains in the statistical sense. On the other hand, if the HeNB cell transmission behavior is mandated, the transmissions are orthogonalized, and the DL interference to UEs both in macro and HeNBs is avoided.

In the second embodiment of the present invention, the network implementation allows transmission of a "load indicator" in the system broadcast of a HeNB. The serving macro cell and the HeNB can map the cell identity (e.g., PCID) and load indicator to a subset of resources: f(PCID, load-indicator)→resources. The UE can send a measurement report listing the HeNB PCID/GCID, the HeNB's frame timing say, as an offset relative to the frame timing macro cell and the load indicator. In one further embodiment, a UE can to periodically read system broadcast (e.g., Master Information Block, System Information Block, etc.) of non-serving HeNBs. As a further alternative, the UE can read the time-frequency reuse pattern (or HeNB data transmission "zone" in time/frequency) used by the HeNB in its system broadcast. Mechanisms to reduce the system information broadcast reading of the non-serving HeNB are possible. For example:

- A UE reads system information broadcast only if HeNB RSRP is greater than macro cell RSRP by an offset; where the offset can be a function of macro RSRP or can be configured by the serving macro cell.
- A UE reads system information broadcast only if some HeNB RSRP criterion is met for a certain duration of time.
- A UE reads system information broadcast only if path loss from a HeNB is less than a threshold.

Figure 4:
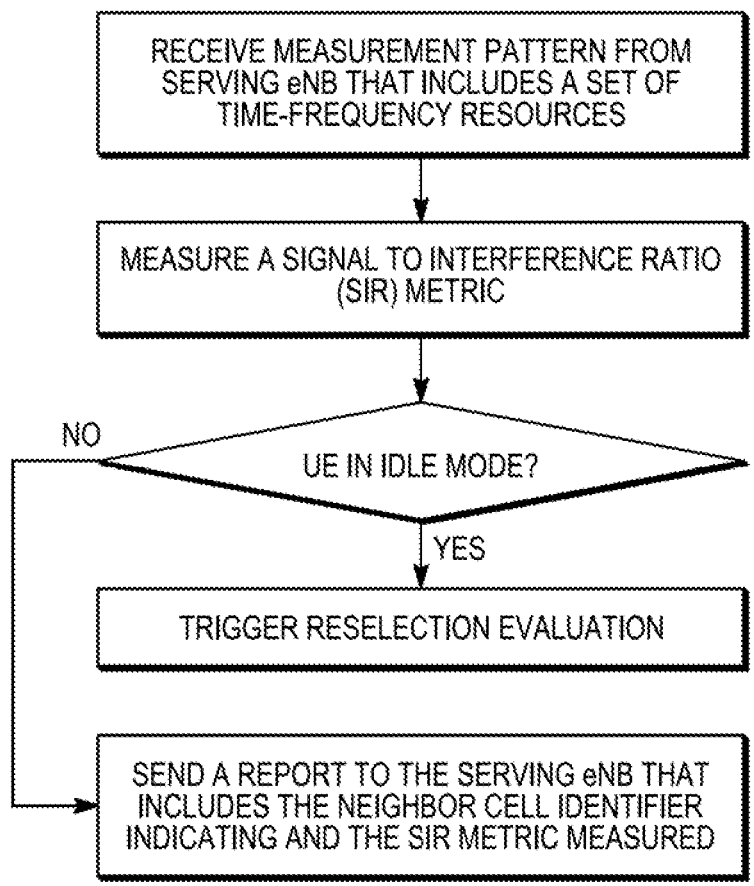
FIG. 4 shows a flow chart of UE receiving a measurement pattern, measuring load/interference on that pattern and either reporting it or triggering reselection.

In a third embodiment of the present invention corresponds to a heterogeneous deployment with transmitters with different operating powers. The method of UE association to base stations based on a signal to interference ratio (SIR) metric such as reference signal-signal to interference and noise ratio (RS-SINR) or reference signal receive quality (RSRQ) has advantages over RSRP based association. For a UE in connected mode, the serving eNB can configure the UE for measurement reporting (event triggered or event triggered periodic or a periodic measurement) of a SIR metric. For a UE in idle mode, the serving eNB can configure the UE to trigger a reselection evaluation when the SIR metric falls below a certain configured threshold. FIG. 4 presents aspects of methods of this third embodiment.

One can envisage the following options for a SIR metric.

RSRQ is used as the SIR metric, where RSRQ is defined as follows.

$$RSRQ = \frac{P_{CRS}}{P_{CRS} + L_{serv} + (I+N)},$$

where $P_{CRS}$ is the received pilot power, is the received power of serving cell transmission outside of CRS (also referred to as "load" here) and (I+N) is the total interference plus noise.

The UE behavior consists of estimating RSRQ and if RSRQ is below a threshold (signaled) then this event is triggered and UE sends a measurement report.

RS-SINR is used as the SIR metric where RS-SINR is defined as $$SINR = \frac{P_{CRS}}{(I+N)},$$

may be a better measure as it overcomes some issues raised earlier. Further, a Layer 3 filtering applied to RS-SINR measurements, may be helpful in ensuring that the interference is persistent. In general, two approaches are used for estimating (I+N).

In the first approach, the channel is estimated for pilot REs and an estimate of the variance of the residual signal on those REs gives us an (I+N) estimate.

In the second approach, if a codeword is correctly decoded, then an estimate of the variance of residual signal gives us an (I+N) estimate.

The UE behavior consists of estimating the RS-SINR and if RS-SINR is below a threshold then this event is triggered and UE sends a measurement report.

Channel Quality Information (CQI) is used as the SIR metric where CQI is defined as the highest MCS level that can be transported on a traffic channel such that the block error rate (or packet error rate) is below a certain threshold (for example, a error rate threshold of 10%). For CQI computation, the reference signal that is used for demodulation (cell-specific reference signal or dedicated reference signal, depending on the transmission mode configured) is used for estimating the channel state and interference. If the transmission is carried out on a certain time-frequency repetition pattern (indicated by the measurement pattern), the estimated channel state and interference measurement over the time-frequency pattern is used for CQI computation. The serving eNB can configure a UE to measure CQI as described above and report it back as a periodic or as an event-triggered measurement. When the eNB is only transmitting on time-frequency resources as implied by the pattern, the CQI report provides means for supporting link adaptation.

Hypothetical PDCCH block error rate is used as the SIR metric. Reference signals are used for estimating the channel state and interference. A certain downlink control information (DCI) format is hypothesized as the transmitted control channel and the corresponding block error rate is estimated. The block error rate of a hypothetical PDCCH format can either be reported back to the serving eNB as a periodic report or on an event trigger to help the eNB determine if there is a PDCCH bottleneck. Alternately, the PDCCH block error rate can be used for generating out-of-sync and in-sync indications as part of the radio link monitoring process. In one embodiment, if the PDCCH block error rate exceeds a certain threshold for a certain duration of time, a radio link failure can be triggered by the UE. In idle mode, if the PDCCH block error exceeds a pre-determined threshold, the UE can trigger a reselection evaluation. The UE can also rank the cells available for reselection based on the PDCCH block error rate metric.

There are two problems associated with the RSRQ metric as it is defined in LTE Rel-8. Although, RSRQ is defined as a measure of DL signal quality, one of the problems associated with this metric arises from the way it has been in defined in Rel-8 (TS 36.214). The RSSI measurement, as part of the RSRQ computation, is required to be performed on the same set of resource blocks as that used for measuring RSRP. Since, the used measurement bandwidth can be anywhere from 6 PRBs to allowedMeasBandwidth (defined in TS 36.331) depending on the vendor-specific implementation, the measured RSRQ can either be a narrow-band measurement or a wideband measurement or something in between. Further RSSI needs to be measured on CRS-bearing OFDM symbols only, and TS 36.214 does not specify which subset of those symbols need to be used (i.e., should the measurement be carried out either on the control region only or the data region only or on both). In TS 36.214, RSRQ is however defined only for connected mode. RSRQ in idle mode can re-defined as wideband measurement to more accurately reflect the DL signal conditions. However, even with this, there are potential problems associated with this metric in the following two scenarios.

In a first scenario, large macro-cell load variations will result in an RSRQ threshold configured conservatively (i.e., to a low value)—this may lead to large fraction of paging outage undetected.

Figure 3:
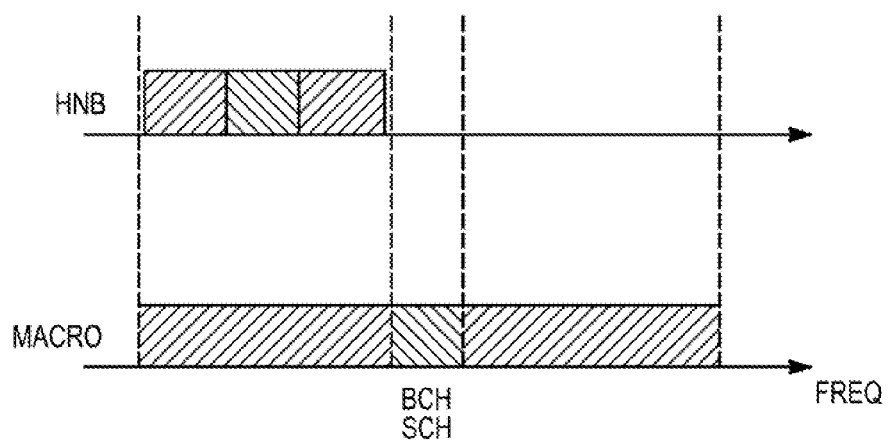
FIG. 3 illustrates a diagram showing the bandwidth arrangement in E-UTRA network (E-UTRAN) downlink.

In a second scenario, when HeNBs are deployed on a partial BW (e.g., 5 MHz HeNB in a 10/20 MHz band, as shown in FIG. 3), RSRQ (or even wideband RS-SINR) is not a good measure of paging reliability.

The first Scenario is further elaborated in the sequel. It was noted earlier that one of scenarios where RSRQ is problematic is where the serving cell load variations are large. For example, a UE is connected to a macro-cell that has a time-varying load will result in large variations in the estimated RSRQ. The measured RSRQ can be low when either the serving cell load is large or when the interference is large or both. It is difficult to distinguish between the following two cases with a single RSRQ threshold: high serving cell load, but low interference from HeNBs; and low serving cell load, but high interference from HeNBs.

A reselection should be triggered only when the HeNB interference is large (case b)) and not when the serving cell load is high but the interference is low (case a)) as a typical eNB scheduler would prioritize paging and SI-x transmission over user traffic even under high loading conditions.

In order that the configured RSRQ threshold (e.g., Sintrasearch or Snonintrasearch) does not lead to unnecessary reselections and excessive power consumption, the network may end up setting a RSRQ threshold that is conservative (i.e., to a low value with a large hysteresis). This may lead to large fraction of paging outage undetected.

The second Scenario is further elaborated in the sequel. As mentioned earlier, the other problem associated with RSRQ as a quality metric is when HeNBs are deployed on a partial BW (e.g., 5 MHz HeNB in a 10/20 MHz band, as shown in FIG. 3). With techniques such as adaptive carrier partitioning being considered for Rel-9 HeNB deployments for interference coordination, it is likely that the many HeNB deployments will be on partial BW.

When a macro-cell UE roams close to a partial BW HeNB and experiences large interference on only a subset of the RBs, paging channel can be reliably received by one or more of the following steps.

1) A Rel-9 UE can employ per-subband interference estimation for both PDCCH and PDSCH decoding to alleviate the effect of a narrowband interferer
2) The serving eNB can transmit paging PDSCH outside of the jammed RBs (i.e., outside of the HeNB-occupied BW) if all HeNBs in its footprint are allowed to use only a part of the BW available to the serving macro-eNB.
3) On the other hand, if the serving eNB does not know a priori which portion of its BW is getting jammed from the HeNB (for example, when adaptive frequency partitioning is used) as the UE is in idle mode and its location is unknown to the serving eNB. In this scenario, the serving eNB can schedule paging PDSCH on different portions of the BW on different paging occasions so that there is at least one paging occasion where the UE can receive the paging PDSCH on a subband not jammed by the interfering HeNB. Alternately, paging PDSCH scheduled on DVRB allocations with sufficiently low code rate can provide the necessary frequency diversity when the UE uses per-subband interference estimation.

The combination 1)+2) or 1)+3) is likely sufficient to address the problem of a partial BW interferer. Clearly, the RSRQ metric, even when defined as a wideband measure is not a good measure of paging reliability if the methods described above are made use of in Rel-9. The main issue is that the measured RSRQ can be low even when the paging channel is quite reliable. Therefore, a reselection may be triggered unnecessarily even when the UE can be paged reliably thereby leading to increased loading and excessive battery drain.

Towards addressing the issues raised in scenario 1 and scenario 2, two solutions are proposed to enhance the RSRQ metric. According to a first solution, the serving eNB transmits a measurement pattern which comprises a set of resource blocks possibly spread over multiple timeslots possibly repeating in time or frequency or both (i.e., time-frequency reuse). The UE is required make RSSI measurements over the RBs indicated by the measurement pattern. For example, when adaptive frequency reuse is implemented where the overlay macro-cell is segmented and the HeNBs use one of the segments, a UE that roams close to a HeNB can experience high interference on the segment that is occupied by the HeNB while the signal quality can be good on the rest of the bandwidth. The serving eNB can configure the UE for RSRQ measurement where the RSSI needs to be measured on the segment not occupied by the HeNB. For this purpose, the serving eNB can signal the set of resource blocks or the set of subcarriers that the UE should exclude from its measurements.

According to a second solution, the serving eNB maintains a constant load over the measurement pattern so that the loading from the serving eNB is factored out in the RSRQ measurement. In other words, by suitably choosing an RSRQ threshold that is aware of the serving eNB load on the measurement pattern, the RSRQ metric can be made equivalent to the RS-SINR metric.

These enhancements can effectively address the problems raised in Scenario 1 and Scenario 2.

For idle mode operation, the following aspects are noted. Triggering of reselection evaluation based on a RS-SINR or RSRQ criterion can be useful. Ranking of candidates based on a RS-SINR or RSRQ criterion and reselection to the "best" allowed cell based on this criterion can be useful. The loading in different potential candidate cells and the interference might be time-varying. The cell on which the UE is camped can signal a measurement pattern (e.g., time-frequency resources with certain re-use factor) over which the UE is asked to measure the RSSI or the interference for a given cell (serving or neighbor cell) in its RS-SINR or RSRQ computation. In particular, it can be specified that the UE measure load/interference on just the data region corresponding to each cell. Each neighbor cell might have data regions corresponding to different time-frequency resources relative to the serving cell if the deployment is asynchronous. If RSRQ is used are measurement, the serving eNB can maintain a constant load on certain time frequency resources. For example, a constant load is maintained over a measurement pattern comprising two consecutive subframes (2 ms) separated by 50 ms. The load can be constant over all the RBs in these subframes or over just a subset of the RBs available (so called, "constant load region"). This pattern can be signaled to UEs over SIB or RRC. The UE measures RSSI, that includes both the interference from co-channel neighbor eNBs, noise and the transmission from the serving eNB (load) over the constant load region indicated by the measurement pattern. This way, by a suitable threshold that is serving-cell load-aware can be configured. In this case, the RSRQ metric is equivalent to a SINR metric that is independent of the serving cell load.

In one embodiment, the UE may autonomously detect the bandwidth of an interfering HeNB that is in range by reading the master information block (MIB) or system information broadcast (SIB) transmission from the HeNB. This allows the UE to identify the set of subcarriers that it needs to exclude from interference measurement in the computation of the SINR metric. Specifically, for RSRQ, the UE can exclude the bandwidth or the set of subcarriers occupied by the HeNB in RSSI measurements so that the RSRQ reflects the quality of the channel within the bandwidth occupied by the serving eNB that excludes the bandwidth occupied by the HeNB. In particular, when the UE (referred to as macro-UE or MUE in the sequel) is in idle mode, this might mean missed paging and the associated consequences (e.g., missed network-originated calls, etc.). The problem becomes especially severe when the MeNB signal is weak in scenarios where the HeNB is far away from the MeNB (e.g., HeNB close to the macro-cell edge). Techniques for adaptation of DL transmit power by the HeNBs along the same lines as that adopted in TR 25.967, "Home Node B Radio Frequency (RF) Requirements (FDD) (Release 9)" are likely to be investigated further for mitigating this problem. However, this alone might not be sufficient. Several approaches have been considered in the LTE context in both RAN WG2 and WG4 to specifically address this problem. One approach is based on HeNB signaling of an intra-frequency reselection indicator (IFRI) bit in its system broadcast which would trigger an inter-frequency reselection and barring of the serving cell frequency layer when the MUE approaches the HeNB R2-092416. Another approach is based on the incorporation of RSRQ-based reselection triggering mechanism together with the existing RSRP-based mechanism in Rel-8. In the sequel, we discuss these methods further.

In R2-092416, a mechanism where a UE camped on a MeNB attempts to reselect to a different carrier, i.e., performs inter-frequency reselection upon detecting that the intra-frequency reselection indicator (IFRI) bit is set by a HeNB that is on the same carrier as the MeNB. This method can be conditionally enabled when the UE roams close to the signaling range of the HeNB based on the pathloss measurements. The IFRI bit, if set, and if the HeNB is the strongest cell, the UE attempts an inter-frequency reselection and/or bars the shared carrier frequency for a fixed duration (e.g., 300 sec) from reselection. However, the need to read IFRI bit means that every UE is required to decode the SIB transmission from the HeNB (when it detects that it is close to a HeNB). This is an added processing requirement on the UE in idle mode which adds to power consumption particularly when the UE can deduce that the HeNB belongs to closed subscriber group from its physical cell identity (PCID). Apart from this issue, it has been noted in R4-091896 that, even with DL power adaptation, there are still a large percentage of users that either unnecessarily trigger a reselection when the signal conditions are still good or do not trigger a reselection even when the signal conditions severely deteriorate when the IFRI method used.

In R4-091895, it has been suggested that adding a RSRQ-based triggering mechanism in addition to the existing RSRP-based triggering in Rel-8 can significantly mitigate the problem. In this proposal, RSRQ is used as a metric for detecting a DL signal quality problem arising out of large interference from HeNB transmissions. The UE is required to monitor both RSRP of the serving cell and the RSRQ, and if either metric drops below the respective thresholds, a reselection evaluation is triggered.

Although, RSRQ can be used as indication of the DL signal quality, one of the problems associated with this metric arises from the way it has been in defined in Rel-8 TS 36.314 v8.6.0, "Physical Layer—Measurements". The RSSI measurement, as part of the RSRQ computation, is required to be performed on the same set of resource blocks as that used for measuring RSRP. Since, the used measurement bandwidth can be anywhere from 6 PRBs to allowedMeasBandwidth (defined in TS 36.331) depending on the vendor-specific implementation, the measured RSRQ can either be a narrow-band measurement or a wideband measurement or something in between. In TS 36.314 v8.6.0, "Physical Layer—Measurements", RSRQ is however defined only for connected mode.

RSRQ in idle mode can re-defined as wideband measurement to more accurately reflect the DL signal conditions. However, in the next section, we discuss why even with this, there are potential problems associated with this metric. In summary, a poorly defined RSRQ leads to the following problems. First, large macro-cell load variations will result in an RSRQ threshold configured conservatively (i.e., to a low value)—this will lead to large fraction of paging outage undetected. Second, when HeNBs are deployed on a partial BW (e.g., 5 MHz HeNB in a 10 or 20 MHz band), RSRQ (or even wideband RS-SINR) is not a good measure of paging reliability. Some, wideband CQI mechanism with frequency selective interference estimation seems necessary.

However, the problem described with RSRQ can be circumvented as follows. To address the concerns we raised earlier with RSRQ, the following additional methods can be adopted.

The macro-eNB can ask the UE to only measure load+interference for RSRQ measurement on a certain pre-determined set of RBs and certain symbols—currently whether the UE uses data region or control for measuring RSRQ or whether it uses narrow band or wide band is unspecified. The macro-eNB can maintain a constant load on a subset of RBs (i.e., on some RBs on some subframes) so that it can configure an RSRQ threshold based on the expected serving cell load. This removes load dependence of RSRQ.

The network operations and management (O & M) might know which subband HeNB are allowed to deploy themselves on (e.g., one preferred HeNB deployment approach is to use 5 MHz for HeNBs out of 20 MHz in a macro-cellular overlay). So, the RBs where interference from non-allowed CSG or hybrid cells are present can be configured for measurement. Alternately, it may be better to signal the RBs that the UE should exclude from load measurements rather than signal the set of RBs to measure on as the macro-eNB would likely allocate paging PDSCH outside that region. Signaling the set of RBs to be excluded may be preferable because measurement performed on the center 6 PRBs on symbols that bear synchronization (SCH) or Physical Broadcast Channel (PBCH) in a synchronous deployment are not indicative of the HeNB interference or of paging channel quality.

In connected mode, the UE can choose certain RBs and certain symbols where it measures load and interference in order to calculate RSRQ. The UE can then send a measurement report that includes the calculated RSRQ and the RBs and symbols over which the load and interference are measured. The eNB, based on its knowledge of loading in the reported RBs and symbols can estimate the additional interference caused by the HeNB.

Finally, if a fixed timing offset is used for all HeNBs relative to the macro-eNB (our control channel protection proposal) that the network (NW) is aware of, this offset can be signaled to the UE so that it can measure RSRQ only on the data region.

Paging channel is addressed by physical downlink control channel (PDCCH) format 1C. PDCCH is the likely bottleneck in both coverage-limited and interference-limited scenarios. Therefore, if the UE were to reliably predict the performance of paging, it can then use this as the basis for identifying DL signal quality problems where the paging channel is likely to fail. There are a few reasons why accurate paging performance prediction is feasible.

Link quality prediction methods like EESM, MMIB, etc. have been shown to be quite accurate in estimating the block error rate (BLER) of coded packet transmissions in an OFDM link. These methods can naturally fold in the impact of transmit antenna configuration (SIMO, SFBC or SFBC-FSTD), PDDCH power boost, number of control symbols and CCE aggregation level used into the performance of PDCCH DCI format 1C transmission.

In heterogeneous deployments where there are HeNB transmissions with partial BW overlap, frequency selective interference on the DL can be estimated on subband basis. The impact of narrowband interferers on wideband PDCCH signaling can be accurately captured if subband interference estimation were to be used.

PDCCH DCI format 1C performance is indicative of paging channel performance in most scenarios. DCI format 1C transmission quality prediction can be carried in a manner similar to what is currently being done for in-sync detection as part of radio link monitoring in Rel-8. The block error rate (BLER) associated with a hypothetical 1C transmission can be computed from RS-SINR evaluated on a subcarrier or a subband level. The transmission parameters associated with the hypothetical PDCCH can be chosen to be either the best case parameters (e.g., +4 dB PDCCH power boost) or normal case transmission parameters (e.g., 0 dB PDCCH power boost) similar to what was adopted for in-sync detection in radio link monitoring.

When a UE connected to a macro-eNB is within the interference range of a HeNB that is deployed on a partial bandwidth relative to the macro-eNB (e.g., 5 MHz HeNB deployed on a overlay macro-eNB network with 10 MHz bandwidth), a part of the macro-eNB bandwidth is always blocked by high interference from HeNB if the UE is close to the HeNB. In such a scenario, a frequency-domain pattern indicating the bandwidth occupied by the HeNB can be made use of in interference estimation as part of paging channel BLER prediction.

With the enhancements to RSRQ measurement proposed in this embodiment, the RSRQ metric measured at the UE can be used as a reliable means to predict the paging channel performance. The enhanced RSRQ method may be used as sub-optimal alternative to paging channel prediction based on hypothetical PDCCH block error rate estimation. The following further embodiments can be envisaged with the enhanced RSRQ approach.

In a first embodiment, both intra-frequency reselection evaluation and inter-frequency reselection evaluation can be triggered if the respective S-conditions (determined by the thresholds $S_{intrasearch}$ and $S_{nonintrasearch}$ respectively) can be triggered with the enhanced RSRQ. Both coverage limited scenarios (due to low RSRP at cell edge) and interference-limited scenarios (high interference due to a nearby open-access or a closed CSG) can be detected by enhanced RSRQ, however, it might be desirable for network operators to dimension their cell size based on RSRP. So, enhanced RSRQ may be used in addition to RSRP in reselection. For example, a reselection may be triggered if either RSRQ falls below a first threshold or if RSRP falls below a second threshold.

In a second embodiment, when other radio access technologies (RATs) such as GSM/EGPRS, WCDMA, CDMA 2000 1x/HRPD, etc. are configured as inter-RAT layers or when LTE is configured on other carrier frequencies as an inter-frequency carrier with priorities different from the serving cell priority, in Rel-8, $Thresh_{x,high}$, $Thresh_{x,low}$, $Thresh_{serving,low}$ are used as thresholds triggering reselection to a higher priority layer or a lower priority layer. The measurement used is RSRP. This can be easily extended to enhanced RSRQ, where a reselection or a reselection evaluation is triggered if the enhanced RSRQ measurement falls below the relevant threshold. When non-intra frequency hot spot with partial BW overlap interferes with macro UEs, wideband CQI with frequency selective interference measurement can detect if there is paging outage or not.

In a third embodiment, when the UE is in a coverage-limited region, an out-of-service area state is activated based on the measured RSRP falling below a certain pre-determined threshold. The same is applicable to RSRQ. If RSRQ drops below a threshold for a certain duration of time, the UE can declare an out-of-coverage area event and display this state on its screen visible to the user.

In a fourth embodiment, when the UE is in the presence of a non-allowed CSG cell, the event can be detected by comparing the measured RSRQ against a threshold. In this event, three options are possible. How to handle non-allowed CSG cell. A first option is barring when it is the best cell (after evaluation of $S_{intrasearch}$). A second option is no particular behaviour (out-of-service area or $Thresh_{serving,low}$ using RSRQ could detect problem). A third option is deprioritization if it is the best cell with some offset.

In a fifth embodiment, once a reselection evaluation is triggered, in Rel-8, the common approach is to measure RSRP for LTE cells on layers with equal priority and rank them. A reselection is performed to the best cell if it happens to remain the highest ranked for a certain duration of time (Treselection). However, enhanced RSRQ can also be used for ranking instead of RSRP.

In the previous embodiments, the serving eNB transmits a measurement pattern indicating a set of resource blocks (RBs) over a certain number of timeslots that can possibly have a certain time-frequency reuse. One timeslot can correspond to one OFDM symbol (i.e., 71 us in time for normal cyclic prefix), or one slot (0.5 ms) or one subframe (1 ms) or some other time interval. The set of RBs can be one RB (12 subcarriers) or can span the entire downlink bandwidth. The pattern can be formed by repeating a basic pattern in frequency (frequency reuse) or in time (time reuse) or both in time and frequency (time-frequency reuse which is the more general case). Therefore, the pattern comprises a set of RBs spread across a number of timeslots. In one embodiment, the measurement pattern can be a set of contiguous physical resource blocks with a frequency offset and a second parameter corresponding to the number of RBs in the pattern. This pattern can repeat in time once every subframe resulting in a time reuse factor of 1 ms in E-UTRA. In another embodiment, the measurement pattern can be a set of non-contiguous resource blocks (with a bit-map association to the RBs). In a third embodiment, the measurement pattern can be derived from a zero-one valued matrix of size M×N, where M is the number of RBs available in frequency domain and N is the number of RBs available in time domain (e.g., number of slots or subframes). The time reuse factor for this pattern corresponds to the amount of time required for transmission of N RBs in time domain. As one example of this embodiment, the zero-one matrix is a submatrix of a P×P permutation matrix, where P=max{M, N}. The term time-frequency reuse implies a certain repetition interval for the basic pattern on a time-frequency grid. Frequency-only reuse is a special case of this wherein a basic pattern is repeated in frequency domain only. Time-only reuse is another special case wherein a basic pattern is repeated in the time domain only.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless terminal transceiver, the method comprising:
receiving, at the wireless terminal transceiver, a sequence of frames from a first base station, each frame in the sequence containing a first set of time-frequency resources which are used for scheduling data and a second set of time-frequency resources not used for scheduling data;
receiving, at the wireless terminal transceiver, a message from the first base station identifying a third set of time-frequency resources that is a subset of the first set of time-frequency resources;
estimating a channel state based on a sequence of frames received by the wireless terminal transceiver from a second base station that coincide with the third set of time-frequency resources; wherein estimating a channel state comprises estimating a reference signal received power of the first base station.

2. The method of claim 1 wherein estimating a channel state comprises estimating a reference signal received power of the second base station.

3. The method of claim 1 further comprising sending a message to a serving base station including at least one of a reference signal received power or a signal to interference ratio metric.

4. The method according to claim 1, wherein the time-frequency resources are symbol durations, time-slots, subframes or frames.

* * * * *